United States Patent
Kane

(10) Patent No.: US 6,909,730 B2
(45) Date of Patent: Jun. 21, 2005

(54) PHASE-LOCKED LOOP CONTROL OF PASSIVELY Q-SWITCHED LASERS

(75) Inventor: Thomas J. Kane, Menlo Park, CA (US)

(73) Assignee: Lightwave Electronics Corporation, Mountain View, CA (US)

( * ) Notice: Subject to any disclaimer, the term of this patent is extended or adjusted under 35 U.S.C. 154(b) by 44 days.

(21) Appl. No.: 10/377,978

(22) Filed: Mar. 1, 2003

(65) Prior Publication Data

US 2003/0179785 A1 Sep. 25, 2003

Related U.S. Application Data

(60) Provisional application No. 60/365,936, filed on Mar. 19, 2002.

(51) Int. Cl.[7] .................................................. H01S 3/11
(52) U.S. Cl. ........................................................ 372/10
(58) Field of Search ........................ 372/10–11, 18–19, 372/22, 14

(56) References Cited

U.S. PATENT DOCUMENTS

| | | | | |
|---|---|---|---|---|
| 3,609,389 A | * | 9/1971 | Bjorkholm | .................... 359/330 |
| 3,764,937 A | * | 10/1973 | Skolnick et al. | ............... 372/11 |
| 4,329,664 A | * | 5/1982 | Javan | .......................... 359/276 |
| 4,572,662 A | * | 2/1986 | Silverman | ................... 356/5.15 |
| 4,744,650 A | * | 5/1988 | Becker et al. | ................. 352/84 |
| 4,749,961 A | * | 6/1988 | Kato et al. | ..................... 331/14 |
| 4,834,945 A | * | 5/1989 | Becker et al. | ............ 422/82.05 |
| 5,119,382 A | * | 6/1992 | Kennedy et al. | ............... 372/11 |
| 5,394,413 A | * | 2/1995 | Zayhowski | ................... 372/10 |
| 5,412,673 A | * | 5/1995 | Caprara et al. | ................ 372/19 |
| 5,654,973 A | * | 8/1997 | Stultz et al. | ................... 372/10 |
| 5,767,969 A | * | 6/1998 | Chevalier | .................... 356/461 |
| 5,802,083 A | * | 9/1998 | Birnbaum | ..................... 372/11 |
| 5,832,008 A | * | 11/1998 | Birnbaum et al. | ............. 372/11 |
| 5,847,816 A | * | 12/1998 | Zediker et al. | ............. 356/5.09 |
| 6,356,128 B2 | | 3/2002 | Suga et al. | .................. 327/160 |
| 2001/0014131 A1 | * | 8/2001 | Mashimo et al. | ........... 375/289 |
| 2002/0158211 A1 | | 10/2002 | Gillispie | .................. 250/458.1 |
| 2003/0048814 A1 | * | 3/2003 | Gross et al. | ................. 370/539 |
| 2003/0118060 A1 | * | 6/2003 | Spuehler et al. | .............. 372/18 |

OTHER PUBLICATIONS

Schibli, et al., "control of Q–switched mode locking by active feedback,", optics Letters, vol. 26, May, 2001, pp. 692–694.*

Written Opinion in related International Application PCT/US03/07293.

* cited by examiner

*Primary Examiner*—Thuy V. Tran
*Assistant Examiner*—Hung Tran Vy
(74) *Attorney, Agent, or Firm*—JDI Patent; Joshua D. Isenberg

(57) ABSTRACT

Methods and apparatus for controlling a passively Q-switched laser (PQSL) that use a Q-switched laser as a voltage controlled oscillator (VCO) in a phase-locked loop control circuit are disclosed. The PQSL may be optically coupled to a detector. The detector may be coupled to a an input of a phase lock loop controller. A reference oscillator may be coupled to a reference input of the phase lock loop controller. An output of the phase lock loop controller may be coupled to an integrator. The integrator may be coupled to a means for controlling an amount of power provided to the PQSL.

9 Claims, 1 Drawing Sheet

PHASE-LOCKED LOOP CONTROL OF PASSIVELY Q-SWITCHED LASERS

CROSS-REFERENCE TO A RELATED APPLICATION

This application claims priority from U.S. Provisional Application No. 60/365,936, filed Mar. 19, 2002, the entire disclosures of which are incorporated herein by reference.

GOVERNMENT RIGHTS IN THE INVENTION

This invention was made under contract # F29601-99-C-0136 by the United States Air Force. The government has certain rights in the invention.

FIELD OF THE INVENTION

This invention is related to lasers and more particularly to control of Q-switched lasers.

BACKGROUND OF THE INVENTION

Attempts have been made to develop low cost, simple lasers for use as light sources in laser display systems, biophotonics detection systems, and semiconductor micromachining systems. Passively-Q-switched lasers are attractive for these applications as they are simple and low cost, yet produce powerful pulses of light that are immediately useful, or are well suited to converting to other wavelengths. Passively Q-switched lasers can produce pulses over a wide range of repetition frequencies and pulse energies, further enhancing their utility. However, most applications have not adapted the use of passive Q-switching. Acousto-optic Q-switching is much more prevalent due to its greater ability to produce strong pulses and its ability to produce these pulses in close synchronization with the other functions of the system. Acousto-optic Q-switching has become the standard, although it is a more complex and expensive technique than passive Q-switching. This expense and complexity has prevented the use of Q-switched lasers of any kind in many applications, particularly high volume, lower cost situations.

Although passive Q-switching is simpler and less expensive than acousto-optic Q-switching, passively Q-switched lasers are unable to deliver pulses in close synchronism with an externally-applied clock frequency. Although the pulse repetition frequency is proportional to the power with which the Q-switched laser is pumped, there is no direct way to synchronously control the pulse repetition frequency of a passively Q-switched laser. There is no equivalent of a trigger that can put out pulses on demand.

Should this deficiency be overcome, the PQSL would have application in tasks such as electronic trimming of integrated circuits and other micromachining. Through frequency conversion, the PQSL would become a good choice for fluorescence microscopy, flow cytometry, and other biophotonic applications. This inability to be synchronous, due to the free-running characteristic of PQSLs, has limited their use.

Thus, there is a need in the art, for a passive Q-switched laser control systems and methods that overcome the above disadvantages.

SUMMARY OF THE INVENTION

The disadvantages associated with the prior art are overcome by methods and apparatus for controlling a passively Q-switched laser (PQSL) that use a Q-switched laser as a voltage controlled oscillator in a phase-locked loop control circuit. According to embodiments of the invention, the PQSL may be optically coupled to a detector. The detector may be coupled to an input of a phase lock loop controller. A reference oscillator may be coupled to a reference input of the phase lock loop controller. An output of the phase lock loop controller may be coupled to an integrator. The integrator may be coupled to a means for controlling the amount of power provided to the PQSL. For example, a laser diode may provide pump power to the PQSL and the integrator may be coupled to a diode controller that regulates the amount of current provided to the laser diode.

The components above may be combined with a passively Q-switched laser in a phase lock loop controlled passively Q-switched laser (PQSL) system. In such a system, the timing of pulses from the PQSL may be controlled relative to a signal from the reference oscillator.

Embodiments of the present invention provide for locking the phase of Q-switched lasers over a wide range of frequencies.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Figure 1:
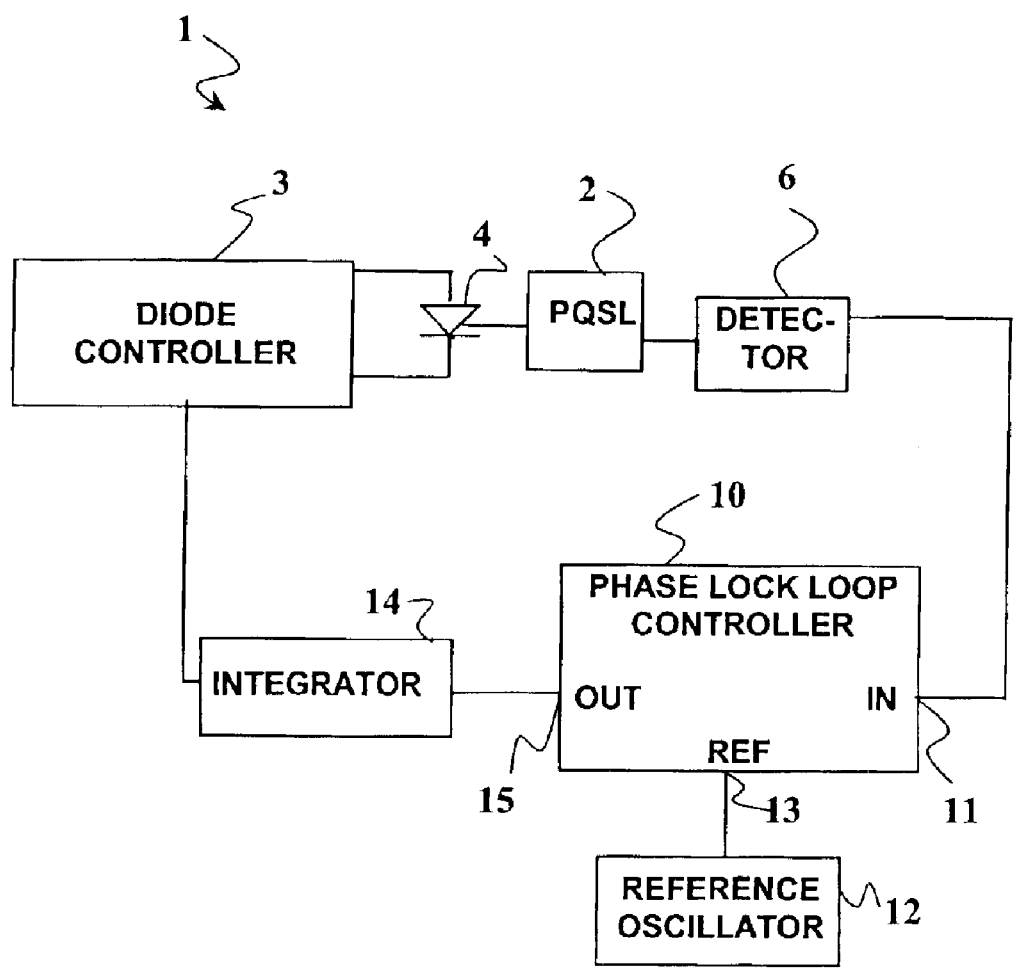
FIG. 1 is a simplified block diagram of a Q-switched laser system according to an embodiment of the present invention.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

The present invention recognizes that a passively Q-switched laser (PQSL) is equivalent to a voltage controlled oscillator (VCO). Voltage controlled oscillators can be used to create phase-locked loops. Thus, it is possible to lock the frequency and phase of the pulses created by the laser to a reference oscillator. The pulse frequency response of the PQSL is a monotonic function of the applied pump power over much of its operating range, allowing the loop to be closed. The inventor has developed examples of such phase locked PQSL systems that demonstrate that this phase locking is possible over two full octaves of repetition rate. This can be a much larger range than is needed in display systems and other applications.

An example of a laser system 1 that utilizes a phase locked loop control circuit for pulse repetition rate control may be configured as shown in FIG. 1. The control circuit for a passively Q-switched laser (PQSL) 2 may include a laser diode 4 that provides pumping power to the PQSL 2. By way of example, the PQSL 2 may be a model ML-00005 laser from Synoptics of Charlotte, N.C. operating at 1064 nm. By way of example, the laser diode 4 may be built into the Synoptics PQSL package. The PQSL 2 and diode 4 operate under the control of a controller 3. In a particular embodiment, a Model 110 laser controller from Lightwave Electronics of Mountain View, Calif., may be used to control the diode current and temperature. Alternatively, the PQSL may be powered with a commercial diode current controller such as a Model 6000 Laser Diode Controller available from Newport Corporation of Irvine, Calif.

A detector 6 is optically coupled to the PQSL 2 and the detector 6 is coupled to an input 11 of a phase lock loop controller 10. A reference oscillator 12 is coupled to a reference input 13 of the phase lock loop controller 10, and an integrator 14 is coupled to an output 15 of the phase lock loop controller 10. The integrator 14 may be implemented with generic operational amplifier circuitry. The integrator 14 is coupled to the controller 3, which controls an amount of pump power that the laser diode provides to the PQSL. The Phase Locked Lop controller 10 may be implemented on a Programmable Logic Device (PLD) available from Altera Corporation of San Jose, Calif. A suitable program such as PLL may implement the phase control in the Phase Locked Loop Controller 10. In some applications, the detector may optionally include a divide-by-2 flip-flop that receives a pulse train characterized by a pulse frequency f and produces an output pulse train characterized by a pulse frequency f/2. Alternatively, an external divide-by-2 flip-flop may be coupled between the detector 6 and the input 11 of the phase lock loop controller 10.

In a particular embodiment, the controller 3 controls a current to the laser diode 4, which in turn controls the amount of power provided by the laser diode 4. The diode controller 3 allows the current supplied to the diode 4 to be controlled by a voltage applied to the controller 3. To control the pulse repetition rate of the PQSL 4, the system 1 operates as follows. The integrator 14 creates a voltage that is applied to the diode controller 3. The voltage from the integrator 14 controls the current supplied to the laser diode 4. The laser diode current controls the power from the laser diode 4. The power from the laser diode 4 determines the pulse repetition rate of the PQSL 2. In the embodiment depicted in FIG. 1, the control at each step is roughly linear. Thus the combination of the controller 3, the laser diode 4 arid PQSL 2 is equivalent to a Voltage Controlled Oscillator. Thus, the pulse repetition frequency of the PQSL 2 depends on the current driven through the laser diode 4. Furthermore, the timing of pulses from the PQSL 2 may be controlled relative to a signal from the reference oscillator 12.

Experimentally it has been confirmed that the pulse repetition frequency in a PQSL controlled by a circuit of the type shown in FIG. 1 behaves monotonically with current drive. The results of timing jitter of the phase-locked passively Q-switched laser, relative to reference frequency are summarized in Table I below, where $F_0$ is the midpoint of the frequency range over which phase locking was demonstrated. In one particular example, $F_0$ was approximately 10 kilohertz (kHz). Phase locking was demonstrated from half of $F_0$ to two times $F_0$.

TABLE I

| Frequency | Peak-to-peak % Jitter between reference & laser |
|---|---|
| 1/2 × $F_0$ | 0.8% |
| $F_0$ | 1.6% |
| 2 × $F_0$ | 10% |

The results demonstrate that the goal of lockability of a passively Q-Switched laser was completely achieved.

Control of phase may in the manner described above may be important to other applications in addition to displays. For example, phase locked loop pulse repetition rate control may be used in association with lasers used for precise machining operations, such as memory repair.

While the above is a complete description of the preferred embodiment of the present invention, it is possible to use various alternatives, modifications and equivalents. For example, the pump power provided by the laser diode may be controlled by controlling the diode temperature. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

What is claimed is:

1. A method for controlling the pulse repetition rate of a passively Q-switched laser (PQSL), comprising using the Q-switched laser as a voltage controlled oscillator in a phase-locked loop control circuit, wherein the passively Q-switched laser is pumped by a laser diode and wherein the phase-locked loop control circuit controls a repetition rate of the Q-switched laser by controlling a an amount of pump power provided to the PQSL, wherein the PQSL is optically coupled to a detector, wherein the detector is coupled to an input of a phase lock loop controller, wherein a reference oscillator is coupled to a reference input of the phase lock loop controller.

2. The method of claim 1 wherein an output of the phase lock loop controller is coupled to an integrator.

3. The method of claim 2 wherein the integrator is coupled to a means for controlling an amount of pump power provided to the PQSL.

4. The method of claim 3 wherein the means for controlling an amount of pump power provided to the PQSL includes a diode controller that regulates a diode current of the laser diode.

5. An apparatus for controlling a passively Q-switched laser (PQSL), comprising a laser diode for providing pumping power to the PQSL;

a detector optically coupled to the PQSL; and a phase locked loop control circuit that uses the Q-switched laser as a voltage controlled oscillator, wherein the phase locked loop control circuit includes a phase lock loop controller having an input coupled to the detector; and a reference oscillator coupled to a reference input of the phase lock loop controller, wherein the phase-locked loop control circuit controls a repetition rate of the Q-switched laser by controlling an amount of pump power provided to the PQSL wherein the phase-locked loop control circuit controls a repetition rate of the Q-switched laser by controlling a diode current of the laser diode.

6. The apparatus of claim 5, further comprising an integrator coupled to an output of the phase lock loop controller.

7. The apparatus of claim 6, wherein the integrator is coupled to a means for controlling a diode current of the laser diode.

8. A phase lock loop controlled passively Q-switched laser (PQSL) system, comprising:

a passively Q-switched laser
a laser diode for providing pumping power to the PQSL;
a detector optically coupled to the PQSL;
a phase lock loop controller having an input coupled to the detector;
a reference oscillator coupled to a reference input of the phase lock loop controller; and
an integrator coupled to an output of the phase lock loop controller, wherein the integrator is coupled to means for controlling the means for providing pump power to the PQSL whereby the timing of pulses from the PQSL maybe controlled relative to a signal from the reference oscillator.

9. The system of claim 8, wherein the means for controlling the means for providing pump power to the PQSL controls a current to the laser diode.

* * * * *